Nov. 16, 1965  N. SKIROW ETAL  3,217,771
GLASS STORAGE CONTAINER AND CARRIER
Filed Jan. 2, 1964  2 Sheets-Sheet 2
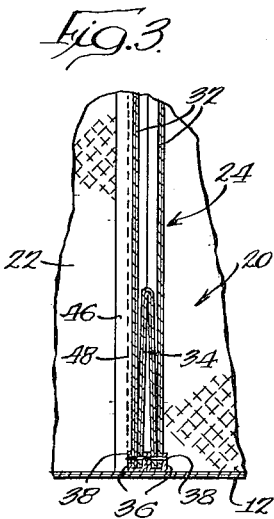
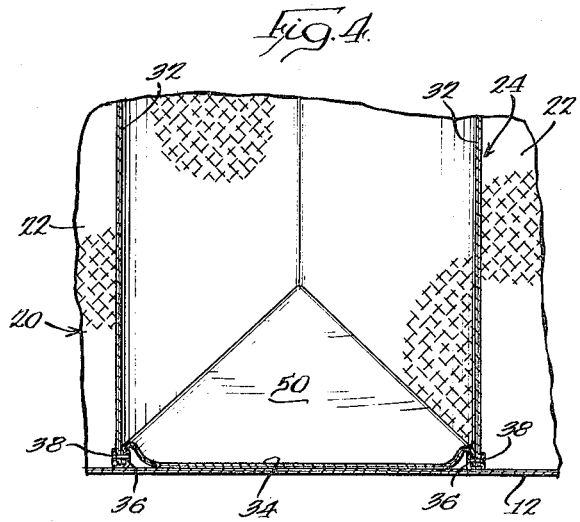
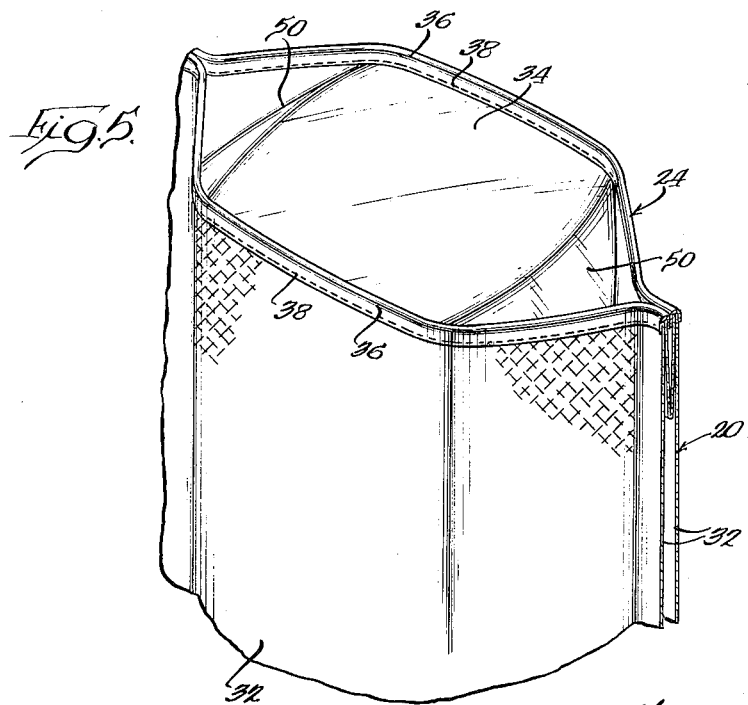
INVENTORS:
Nathan Skirow
Benjamin A. Skirow
By B. Gordon Allen
Atty

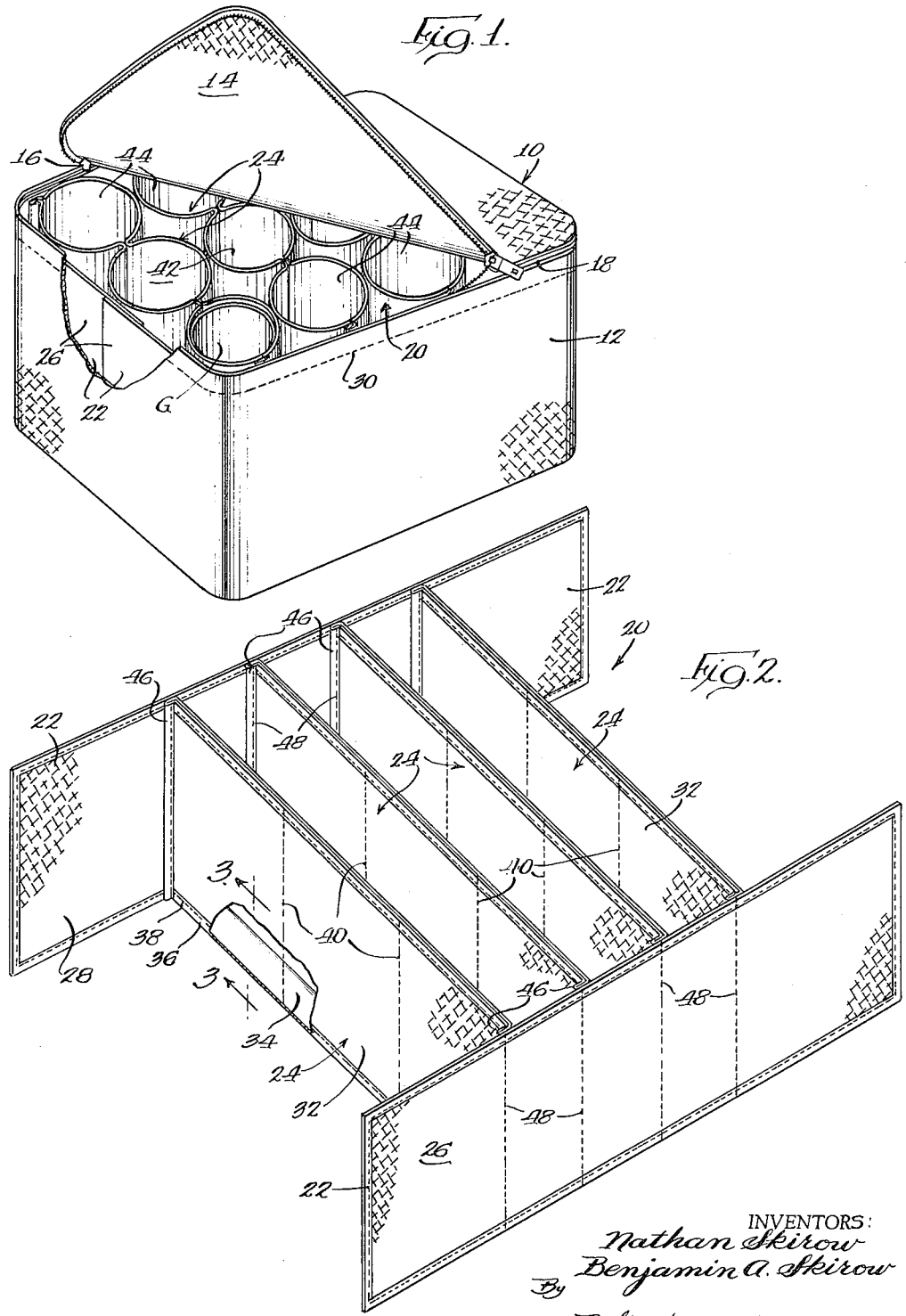

United States Patent Office 3,217,771
Patented Nov. 16, 1965

3,217,771
GLASS STORAGE CONTAINER AND CARRIER
Nathan Skirow, 850 N. DeWitt, and Benjamin A. Skirow, 3750 N. Lake Shore Drive, both of Chicago, Ill.
Filed Jan. 2, 1964, Ser. No. 335,195
2 Claims. (Cl. 150—52)

The present invention relates to a novel glass, goblet or similar article storage container and carrier.

Ordinarily glasses, tumblers, goblets and like articles of crystal are stored in cabinets on shelves, and when they are to be used, are customarily individually carried to the table. If they are not used every day, they usually must be washed or at least wiped to remove accumulated dirt or dust. These articles, particularly if they are fragile, are subject to being broken by falling from the shelf or even by falling down on the shelf.

It is a principal object of this invention to provide a novel storage container and carrier for such articles of glass and crystal to protect them against damage, to shield them from dirt and dust, and to enable them to be carried in numbers simultaneously from the place of storage to the table for use.

Another object is to provide a novel storage container and carrier made of soft flexible material such as leather, plastic, cloth or similar material resistant to wear and soil by handling.

Another object is to provide a novel storage container and carrier for glasses and similar fragile articles which has its interior divided into a plurality of pockets of such size and shape as to receive a single article and to prevent it from coming into direct contact with other articles in the container.

Another object is to provide a novel storage container and carrier for glasses and similar fragile articles which has a divider therein defining a plurality of individual article receiving pockets with each pocket having a cushioning bottom.

Other objects and advantages will become apparent from the following description taken in conjunction with the accompanying drawings wherein:

FIG. 1 is a perspective view of the novel container and carrier of this invention, partially broken away and with the cover partially open for purposes of illustration;

FIG. 2 is a perspective view of the pocket defining divider before being secured in the container;

FIG. 3 is an enlarged fragmentary sectional view through the bottom of one pocket taken along the line 3—3 of FIG. 2 looking in the direction of the arrows, with the pocket defining divider being shown as positioned within the container or box;

FIG. 4 is an enlarged fragmentary sectional view corresponding to FIG. 3 showing the bottom of an expanded pocket; and FIG. 5 is an enlarged fragmentary perspective view of the bottom of an expanded pocket.

In the following description and in the claims the generic words glass and glasses are used to describe and include tumblers, goblets, various items of stemware, and other fragile articles made of glass, crystal, china and the like.

Referring to the drawings, the reference character 10 designates the storage container and carrier in its entirety, and it comprises a generally rectangular container or box 12, having upstanding walls and a cover 14 secured thereto by a fabric hinge 16, the cover being closed by a conventional slide fastener 18 extending around three sides thereof, and which has a pocket defining divider 20 therein. The container or box 12, cover 14 and divider 20 may be made of fabric, plastic, leather or any suitable material preferably pliable, flexible and resistant to wear and soil by handling. The appearance and softness can be enhanced by quilting.

The divider 20 includes a pair of anchoring strips 22 between which extend a plurality, in the illustrated embodiment four, of pocket defining elements 24. The anchoring strips 22 have a composite length somewhat greater than the inner girth of the container or box 12 so that they overlap slightly at their meeting ends as shown by the broken away portion of FIG. 1. The strips 22 preferably are made with a stiffening backing 26 of twill, buckram, denim, duck or the like, faced with the fabric 28 of which the remainder of the container is made. When the strips 22 are sewn to the container or box 12 at 30 with their lower edges against the bottom of the container and their upper edges immediately under the slide fastener 18, the box 12 while retaining its flexibility will not collapse vertically.

Each pocket defining element 24 is slightly longer than twice the short dimension of the container or box 12 across which it extends and comprises a pair of walls 32 and a bottom 34 made of quilted double thickness of the fabric of which the container is made to provide softness and protection of the glasses G against damage. The walls 32 and bottom 34 are made of flat strips with stitching 36 securing the bottom edges of the walls 32, the side edges of the bottom 34 and a binding 38 together. With bottom 34 folded up between the walls 32 the pocket defining element is stitched vertically at 40 to define the central pocket 42. The end pockets 44 are completed by stitching at 48 the ends of the walls 32 and folded bottom 34 together with a binding 46. The ends of the pocket defining elements 24 are then sewn by this same stitching 48 to the inner faces of the anchoring strips 22 with enough room therebetween to allow for the full expansion of each of the pockets 42 and 44. While each pocket defining element is shown as having three pockets, it may of course have two, three, four or more according to the size of the glasses to be stored.

When the structure constituting the pocket defining elements 24 is compressed or compacted from the position shown in FIG. 2 to that shown in FIG. 1 as the divider 20 is placed in the container or box 12, the walls 32 separate to open the pockets 42 and 44 and the bottom 34 thus tends to flatten against the bottom of the box as shown in FIGS. 4 and 5. However this flattening cannot be completely effected because the walls 32 and bottom 34 are vertically sewn together with the bottom folded between the walls as seen in FIG. 3. With the pockets fully opened at their transverse midpoints the bottom will provide cushioning portions 50 to support the edge of the glass which preferably should be stored in an inverted position.

Each glass G in the container and carrier 10 is individually supported in vertical position and prevented from coming into contact with any other glass in the container. Since each glass is individually supported, it does not matter if there are a variety of styles and sizes of glasses in the container or if all of the pockets are not filled. Each one is separately cushioned against damage and protected against dirt and dust.

From the foregoing description it is seen that the objectives which were claimed for this invention at the outset of the specification are fully attained by the disclosed container and carrier.

While a single preferred embodiment of the new and improved glass container and carrier constituting the present invention has been shown and described, it will be apparent that numerous modifications and variations thereof may be made without departing from the underlying principles of the invention. It is therefore intended, by the following claims, to include all such variations and

What is claimed as new and desired to be secured by United States Letters Patent is:

1. A storage container, carrier, and the like for glasses and like articles, comprising in combination, a generally rectangular container having upstanding walls and a cover, means openably securing said cover to said container walls, said container walls and said cover being made of a flexible material, and means secured within said container dividing the interior thereof into a plurality of individual article containing pockets adapted to be expanded into generally cylindrical shapes, said last mentioned means being made of flexible material and comprising a pair of anchoring strips secured to the inner surfaces of said container walls, and a plurality of pocket defining elements extending between and secured to said anchoring strips, each of said pocket defining elements comprising a pair of vertical wall members, and a bottom member, said bottom member being folded upwardly between said wall members and stitched at its side edges to the bottom edge of said wall members, and vertical stitching extending from top to bottom of said wall members to secure said wall and bottom members together with the bottom member in folded condition and to divide said pocket defining element into a plurality of substantially equal sized pockets, said bottom member providing diametrically opposite supporting cushions adjacent said vertical stitching.

2. A storage container, carrier, and the like for glasses and like articles, comprising in combination, a generally rectangular container having upstanding walls and a cover attached thereto along one edge thereof, a slide fastener openably securing said cover to said container walls along the other three sides thereof, said container walls and said cover being made of a flexible quilted material, and a structure secured within said container dividing the interior thereof into a plurality of individual article containing pockets adapted to be expanded into generally cylindrical shapes, said structure being made of flexible quilted material and comprising a pair of anchoring strips positioned against and secured to the inner surfaces of said container walls with their adjacent ends overlapping, and a plurality of pocket defining elements extending between and secured to said anchoring strips, each pocket defining element comprising a pair of vertical wall members, and a bottom member, said bottom member being folded longitudinally along its midpoint to project upwardly between said wall members, stitching securing the bottom edges of said wall members to the side edges of said bottom member, and vertical stitching extending from top to bottom of said wall members to secure said wall and bottom members together with the bottom member in folded condition and to divide said pocket defining element into three substantially equal sized pockets, said bottom member providing diametrically opposite supporting cushions adjacent said vertical stitching.

References Cited by the Examiner

UNITED STATES PATENTS

| | | | |
|---|---|---|---|
| 537,471 | 4/1895 | Merriam | 217—23 |
| 1,223,209 | 4/1917 | Smith | 217—34 |
| 2,261,157 | 11/1941 | Holbrook | 150—34 |
| 2,401,109 | 5/1946 | Rohdin. | |
| 2,538,280 | 1/1951 | Smith | 150—30 |
| 2,580,043 | 12/1951 | Paige | 206—65 |
| 2,657,726 | 11/1953 | Silverman | 190—16 X |
| 3,064,872 | 11/1962 | Skirow | 206—65 X |

FOREIGN PATENTS 1,232,986  5/1960  France.

JOSEPH R. LECLAIR, *Primary Examiner.*

FRANKLIN T. GARRETT, *Examiner.*